United States Patent Office 3,233,010
Patented Feb. 1, 1966

3,233,010
DITHIOPHOSPHONIC ACID ESTERS AND PROCESS FOR THEIR PRODUCTION
Reimer Cölln, Wuppertal-Elberfeld, and Gerhard Schrader, Wuppertal-Cronenberg, Germany, assignors to Farbenfabriken Bayer Aktiengesellschaft, Leverkusen, Germany, a German corporation
No Drawing. Filed Sept. 29, 1960, Ser. No. 59,170
Claims priority, application Germany, Oct. 2, 1959, F 29,519
11 Claims. (Cl. 260—928)

The present invention relates to and has as its objects a new and useful class of insecticidal thiophosphonic acid esters and a new and economic process for their production.

The new compounds of this invention may be represented by the following general formula

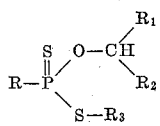

in which R stands for a suitable aliphatic or aromatic radical, $R_1$ and $R_2$ stand for alkyl groups or taken together with the

group a cyclo-alkyl radical and the like (generally spoken

may be designated as a branched chain (cyclo)aliphatic group), and $R_3$ represents broadly a radical which is known from other (thio)-phosphoric or -phosphonic acid esters to yield insecticidally active phosphorus compounds.

Hitherto, most dithiophosphonic acid esters of the general composition (I) have preferably been obtained by reacting thiophosphonic acid ester halides with alkali hydrogen sulfides and then further alkylating them in usual manner. The following scheme illustrates this sequence of reactions:

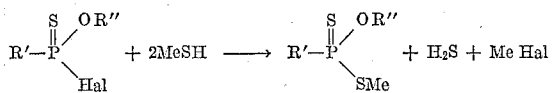

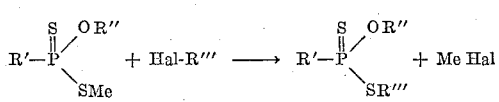

(R', R" and R''' are suitable alkyl or aryl radicals). Other dithiophosphonic acid esters have hitherto also been obtained by reacting thiophosphonic acid ester halides with arbitrary mercaptans in the presence of acid-binding agents, as can be seen from the following scheme:

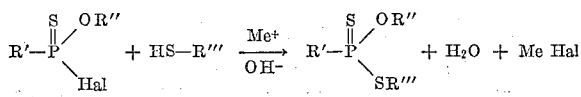

(R', R" and R''' are again suitable organic radicals).

However, only esters of primary alcohols are obtainable by the two processes described above. Esters of secondary alcohols of the following formula

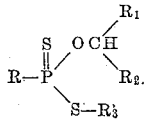

could not be produced by the aforesaid methods as yet, since the corresponding alkyl- or aryl-thionophosphonic acid-O-alkyl ester halides of the following formula

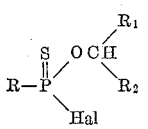

(the symbols in both formulae are the same as said above) required as starting products are not described in the literature.

In accordance with the present invention it has now been found that thionophosphonic acid esters of the above shown composition are obtainable in a simple and elegant manner by reacting the easily obtainable alkyl-, aryl- or aralkyl-dithiophosphonic acid anhydrides (see A. M. Kinnear and E. A. Perren, Soc. 1952, 3437, and U.S. Patent 2,870,204, or P. Fay and H. P. Lankelma, Am. Soc. 74 (1952), 4933) with any secondary alcohols and further reacting the resulting reaction products in the presence of acid-binding agents with suitably substituted alkyl halides. This is shown by the following reaction sequence:

In the first step the secondary alcohol is added to the dithiophosphonic acid anhydride employed so that thiolacids of the following formulae are formed:

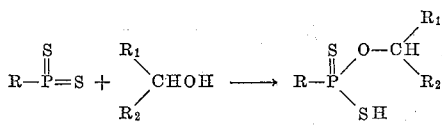

The O-alkyl-thionophosphone-thiol acids thus formed in practically quantitative yield can be reacted with any suitable alkyl halides by methods known as such. Thereby the not yet described thionophosphonic acid-O.S.-diesters having a secondary alkyl radical at the oxygen atom are formed in good yield.

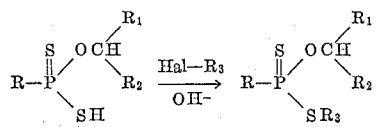

In the above formulae more specifically A stands for lower alkyl or cyclo-alkyl radicals up to 6 carbon atoms or for the phenyl or cyclo-alkyl radical which may be substituted by lower alkyl groups, lower alkoxy groups, halogen atoms and the like;

stands preferably for a branched alkyl group up to 12 carbon atoms or for a cycloaliphatic group between 5 and 8 carobn atoms. $R_3$ stands more specifically for a lower alkyl group to 4 carbon atoms, substituted by lower alkyl-mercapto groups, phenyl-mercapto groups, halogen-substituted phenyl-mercapto groups, phenyl groups, halo-substituted phenyl groups, lower dialkylamino groups, carboxylic ester groups, carboxylic amide groups, the cyano group or also another

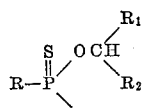

group attached directly or via oxygen or sulfur to the alkyl group $R_3$.

The new compounds of this invention are used in the usual manner for combating damaging insects and the like especially for plant-protection. Dusts as well as liquid formulations are useful. To prepare dusts preferably talcum, chalk, bentonite, kieselguhr and the like are useful. If it is intended to make emulsifiable dusts, the use of suitable emulsifiers may be advantageous, especially such of a non-ionogenic basis, like aryloxy-polyglycol ethers of which several types are on the market. For the production of liquid combinations solutions of the inventive compounds may be used in suitable inert organic diluents. Also water is useful but in connection with suitable emulsifiers and auxiliary solvents. Organic diluents are e.g. alcohols, hydrocarbons, especially chlorinated lower hydrocarbons, such as cloroform, trichloroethylene and the like. The new compounds may furthermore be used in combination with each other or with known insecticides, fertilizers etc.

As examples for the special utility of the inventive compounds the compounds of the following formulae (I) 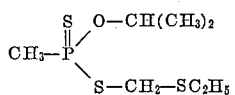

(II) 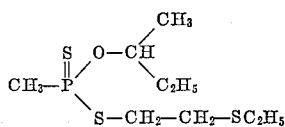

have been tested against aphids and spider mites. Aqueous dilutions of these compounds have been prepared by mixing the active ingredient with the same amount of dimethyl formamide as an auxiliary solvent adding thereafter 20% by weight referred to active ingredient of a commerical emulsifier consisting of a benzyl hydroxy polyglycol ether containing about 10–15 glycol residues, and diluting at last this premixture with water to the desired concentration indicated in the following paragraphs. The tests have been carried out as follows:

(a) Against aphids (contact-insecticidal action) of the type *Doralis fabae*: Heavily infested bean plants (*Victa faba*) have been sprayed drip wet with solutions as prepared above and in a concentration as shown below. The effect has been determined by evaluation after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| I | 0.001 | 100 |
| II | 0.001 | 100 |

(b) Against spider mites (contact-insecticidal action): Bean plants (*Phaseolus vulgaris*) of about 15 inches height are sprayed drip wet with solutions prepared as indicated above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
|---|---|---|
| I | 0.001 | 100 |
| II | 0.001 | 100 |

The following examples are given for the purpose of illustrating the present invention, without, however, limiting it in any way thereto.

*Example 1*

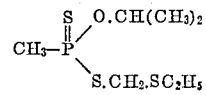

22 g. (0.2 mol) of methyl-dithiophosphonic acid anhydride are suspended while stirring in 150 ml. of isopropyl alcohol. The suspension is heated to 50° C. for a short time. The methyl-dithiophosphonic acid anhydride has then clearly dissolved. A sodium methylate solution containing 0.2 mol of dissolved sodium is then added at 50° C. At 60° C., there are added 22 g. of α-chloromethyl ethyl sulphide and the mixture is heated at 60° C. for another hour. The reaction product is then cooled to room temperature and treated with 150 ml. of water and 150 ml. of chloroform. The mixture is thoroughly stirred and the chloroformic solution separated. The chloroformic solution is again thoroughly shaken with water and subsequently dried over sodium sulphate. Upon fractionating, 35.2 g. of the new ester of B.P. 70° C./0.01 mm. Hg are obtained. Yield: 72% of the theoretical.

Calculated for mol 244.4: P, 12.7%; S, 39.4%. Found: P, 12.9%; S, 39.3%.

Aphids and spider mites are killed completely with a solution of 0.001%. The compound shows an ovicidal action against the eggs of the red spider. Systemic action with 0.1% solutions is 100%.

*Example 2*

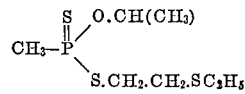

22 g. (0.2 mol) of methyl-dithiophosphonic acid anhydride are dissolved with 150 ml. of isopropyl alcohol at 60° C. while stirring. Subsequently, a sodium methylate solution containing 0.2 mol of dissolved sodium is added at 60° C. 25 g. of β-chloroethyl ethyl sulphide are then added at 70° C. while stirring is continued. The mixture is kept at 70° C. for another hour and then worked up as described in Example 1. 41 g. of the new ester of B.P. 81° C./0.01 mm. Hg are thus obtained. Yield 79% of the theoretical.

Calculated for mol 258.4: P, 12.0%; S, 37.2%. Found: P, 11.9%; S, 36.6%.

Aphids and spider mites are killed completely with a solution of 0.001%. The compound shows an ovicidal action against the eggs of the red spider. Systemic action with 0.1% solutions is 100%.

*Example 3*

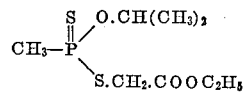

Similarly to Example 1, 22 g. (0.2 mol) of methyl-dithiophosphonic acid anhydride are dissolved in 150 ml. of isopropyl alcohol. The resulting acid is neutralised with a sodium methylate solution containing 0.2 mol of dissolved sodium. Subsequently, 25 g. of chloroacetic acid ethyl ester are added at 70° C. The mixture is kept at 70° C. for another hour and then worked up as described in Example 1. 36.4 g. of the new ester of B.P. 74° C./0.01 mm. Hg are thus obtained. Yield: 71% of the theoretical.

Calculated for mol 256.3: P, 12.1%; S, 25.0%. Found: P, 12.1%; S, 25.0%.

Flies are killed completely with a solution of 0.001%. Spider mites are killed completely with a solution of 0.01%. The compound shows an ovicidal action against the eggs of the red spider. Systemic action with 0.1% solutions is 100%.

*Example 4*

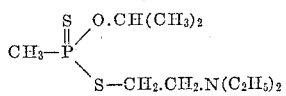

22 g. (0.2 mol) of methyl-dithiophosphonic acid anhydride are dissolved in 150 ml. of isopropyl alcohol. The resulting acid is then neutralised at room temperature with a sodium methylate solution containing 0.2 mol of dissolved sodium. 27.2 g. of β-chloroethyl-diethyl amine are then added at 70° C. with further stirring. The mixture is heated at 70° C. for another hour and then worked up in usual manner. 34.1 g. of the new ester of B.P. 72° C./0.01 mm. Hg are thus obtained. Yield: 63% of the theoretical.

Calculated for mol 269.4: P, 11.5%; S, 23.8%; N, 5.2%. Found: P, 11.0%; S, 23.6%; N, 5.1%.

Aphids are killed completely with a solution of 0.01%. Spider mites are killed completely with a solution of 0.001%. The compound shows an ovicidal action against the eggs of the red spider. Systemic action with 0.1% solutions is 100%.

*Example 5*

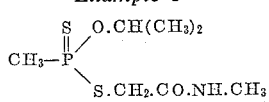

22 g. (0.2 mol) of methyl-dithiophosphonic acid anhydride are dissolved at 60° C. in 150 ml. of isopropyl alcohol as described in Example 1. The resulting acid is then neutralised at room temperature with a sodium methylate solution containing 0.2 mol of dissolved sodium. Subsequently, 21.5 g. of monochloroacetic acid methylamide are added at 70° C. The reaction product is kept at 70° C. for another hour and then worked up in usual manner. 40.6 g. of the new ester are thus obtained as a viscous barely water-soluble oil. Yield: 84% of the theoretical.

Calculated for mol 241.3: P, 12.8%; S, 26.6%; N, 5.8%. Found: P, 12.7%; S, 29.8%; N, 5.8%.

Aphids are killed completely with a solution of 0.001%. Spider mites are killed completely with a solution of 0.01%. The compound shows an ovicidal action against the eggs of the red spider. Systemic action with 0.1% solutions is 100%.

*Example 6*

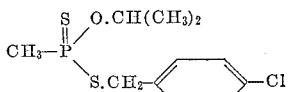

22 g. (0.2 mol) of methyl-dithiophosphonic acid anhydride are dissolved at 60° C. in 150 ml. of isopropyl alcohol. The resulting acid is neutralised at room temperature with a sodium methylate solution containing 0.2 mol of dissolved sodium. Subsequently, 32.2 g. of p-chlorophenyl-benzyl chloride are added at 70° C. The mixture is heated to 70–75° C. for an hour and then worked up as described in Example 1. 55.3 g. of the new ester are thus obtained as a pale brown water-insoluble oil. Yield 93% of the theoretical.

Calculated for mol 294.8: P, 10.5%; S, 21.7%; Cl, 12.0%. Found: P, 9.5%; S, 20.5%; Cl 13.6%.

Aphids are killed completely with a solution of 0.01%. Spider mites are killed completely with a solution of 0.0001%. The compound shows an ovicidal action against the eggs of the red spider. Caterpillars are killed completely with a solution of 0.1%.

*Example 7*

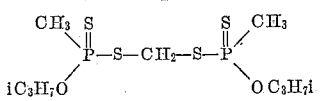

33 g. (0.3 mol) of methyl-dithiophosphonic acid anhydride are dissolved at 60° C. in 200 ml. of isopropyl alcohol. The resulting acid is neutralized at room temperature by the addition of a sodium methylate solution containing 0.3 mol of dissolved sodium. Subsequently, 27 g. of methylene bromide are added at 60° C. The reaction product is heated to 70–75° C. for another hour and then worked up as described in Example 1. 38 g. of the new ester are thus obtained as a pale brown water-insoluble oil. Yield: 72% of the theoretical.

Calculated for mol 352.5: P, 17.6%; S, 36.4%. Found: P, 16.5%; S, 35.1%.

Spider mites are killed completely with a solution of 0.01%. The compound shows an ovicidal action against the eggs of the red spider. Caterpillars are killed completely with a solution of 0.1%.

*Example 8*

$$CH_3-P\begin{matrix}S\\||\end{matrix}\begin{matrix}O.CH\begin{matrix}CH_3\\C(CH_3)_3\end{matrix}\\S.CH_2.CH_2.SC_2H_5\end{matrix}$$

22 g. (0.2 mol) of methyl-dithiophosphonic acid anhydride are dissolved at 60° C. in 150 ml. of pinacolinic alcohol. The resulting acid is neutralised at room temperature with a sodium methylate solution containing 0.2 mol of dissolved sodium. Subsequently, 25 g. of β-chloroethyl ethyl sulphide are added at 70° C. The mixture is heated at 70°C. for a further hour and then worked up as described in Example 1. 42.8 g. of the new ester of B.P. 92° C./0.01 mm. Hg are thus obtained. Yield: 71% of the theoretical.

Calculated for mol 300.5: P, 10.3%; S, 32.0%. Found: P, 10.1%; S, 31.0%.

Aphids are killed completely with a solution of 0.001%. Spider mites are 50% killed with a solution of 0.001%. The compound shows an ovicidal action against the eggs of red spiders. Systemic action with 0.1% solutions is 100%.

*Example 9*

$$CH_3-P\begin{matrix}S\\||\end{matrix}\begin{matrix}OCH\begin{matrix}CH_3\\C_2H_5\end{matrix}\\S-CH_2-CH_2-SC_2H_5\end{matrix}$$

22 g. (0.2 mol) of methyl-dithiophosphonic acid anhydride are dissolved at 60° C. in 150 ml. of secondary butyl alcohol. 63 g. of a sodium ethylate solution containing 0.2 mol of dissolved sodium are added at 70° C. Subsequently, 25 g. of β-chloro-ethyl ethyl sulfide are added at 70° C. The mixture is kept at 70° C. for another hour and then worked up as described in Example 1. 42.4 g. of the new ester of B.P. 90° C./0.01 mm. Hg are thus obtained. Yield: 78% of the theoretical.

Calculated for mol 272.4: P, 11.4%; S, 35.3%. Found: P, 10.8%; S, 36.4%.

Aphids and spider mites are killed completely with a solution of 0.001%. The compound shows an ovicidal action against the eggs of the red spider. Systemic action with 0.1% solutions is 100%.

Example 10

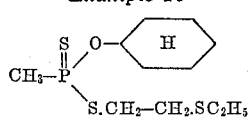

22 g. (0.2 mol) of methyl-dithiophosphonic acid anhydride are dissolved at 60° C. in 150 ml. of cyclohexanol. A sodium ethylate solution containing 0.2 mol of dissolved sodium is added at room temperature. Subsequently, 25 g. of β-chloroethyl ethyl sulphide are added dropwise at 70° C. while stirring. The mixture is kept at 70–75° C. for another hour and then worked up as described in Example 1. 37.8 g. of the new ester of B.P. 110° C./0.01 mm. Hg are thus obtained. Yield: 63% of the theoretical.

Calculated for mol 398.5: P, 10.4%; S, 32.2%. Found: P, 10.0%; S, 30.8%.

Aphids are killed completely with a solution of 0.01%. Spider mites are killed completely with a solution of 0.001%. Systemic action with 0.1% solutions is 100%.

Example 11

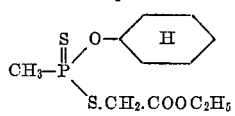

22 g. (0.2 mol) of methyl-dithiophosphonic acid anhydride are dissolved at 60° C. in 150 ml. of cyclohexanol. The resulting acid is neutralised at room temperature with a sodium ethylate solution containing 0.2 mol of dissolved sodium. Subsequently, 25 g. of chloroacetic acid ethyl ester are added at 70° C. The mixture is heated at 70° C. for another hour and then worked up as described in Example 1. 38.3 g. of the new ester of B.P. 110° C./0.01 mm. Hg are thus obtained. Yield: 64% of the theoretical.

Calculated for mol 296.4. P, 10.5%; S, 21.6%. Found: P, 10.7%; S, 21.2%.

Aphids and spider mites are killed completely with a solution of 0.01%. Systemic action with 0.1% solutions is 100%.

Example 12

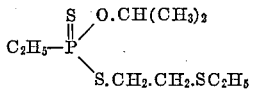

25 g. (0.2 mol) of ethyl-dithiophosphonic acid anhydride are dissolved in 150 ml. of isopropyl alcohol. The resulting acid is neutralised at room temperature with a sodium ethylate solution containing 0.2 mol of dissolved sodium. Subsequently, 2.5 g. of β-chloroethyl ethyl sulphide are added at 70° C. The mixture is kept at 70–75° C. for another hour and then worked up as described in Example 1. 47 g. of the new ester of B.P. 85° C./0.01 mm. Hg are thus obtained. Yield: 86% of the theoretical.

Calculated for mol 272.4: P, 11.4%; S, 35.3%. Found: P, 12.3%; S, 37.1%.

Aphids and spider mites are killed completely with a solution of 0.001%. The compound shows an ovicidal action against the eggs of the red spider. Systemic action with 0.1% solutions is 100%.

Example 13

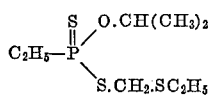

25 g. (0.2 mol) of ethyl-dithiophosphonic acid anhydride are dissolved in 150 ml. of isopropyl alcohol. The resulting acid is neutralised with a sodium ethylate solution containing 0.2 mol of dissolved sodium. Subsequently, 22.2 g. of α-chloromethyl ethyl sulphide are added at 70° C. The mixture is heated at 70° C. for another hour and then worked up as described in Example 1. 40.5 g. of the new ester of B.P. 78° C./0.01 mm. Hg are thus obtained. Yield: 78% of the theoretical.

Calculated for mol 258.4: P, 12.0%; S, 37.2%. Found: P, 12.7%; S, 37.9%.

Aphids and spider mites are killed completely with a solution of 0.001%. The compound shows an ovicidal action against the eggs of the red spider. Systemic action with 0.1% solutions is 100%.

Example 14

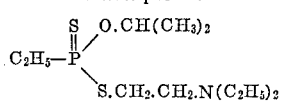

25 g. (0.2 mol) of ethyl-dithiophosphonic acid anhydride are dissolved in 150 ml. of isopropyl alcohol. The resulting acid is neutralised at room temperature with a sodium ethylate solution containing 0.2 mol of dissolved sodium. Subsequently, 27.1 g. of β-chloroethyl diethylamine are added at 70° C. The mixture is heated at 70° C. for another hour and then worked up in usual manner. 43.8 g. of the new ester of B.P. 77° C./0.01 mm. Hg are thus obtained. Yield: 77% of the theoretical.

Calculated for mol 283.4: P, 10.9%; S, 22.6%; N, 4.9%. Found: P, 10.7%; S, 22.8%; N, 4.9%.

Aphids and spider mites are killed completely with a solution of 0.001%. The compound shows an ovicidal action against the eggs of the red spider. Systemic action with 0.1% solutions is 100%.

Example 15

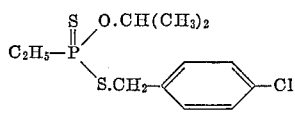

25 g. (0.2 mol) of ethyl dithiophosphonic acid anhydride are dissolved in 150 ml. of isopropyl alcohol. The resulting acid is then neutralised at room temperature with a sodium ethylate solution containing 0.2 mol of dissolved sodium. Subsequently, 32.2 g. of p-chlorophenyl-benzyl chloride are added at 70° C. The mixture is heated at 70° C. for another hour and then worked up in the usual manner. 55.5 g. of the new ester are thus obtained as a pale brown water-in-soluble oil. Yield: 89% of the theoretical.

Calculated for mol 308.8: P, 10.0%; S, 20.8%; Cl, 11.5%. Found: P, 9.1%; S, 20.3%; Cl, 13.5%.

Spider mites are killed completely with a solution of 0.01%. The compound shows an ovicidal action against the eggs of the red spider. Caterpillars are killed completely with a solution of 0.1%.

Example 16

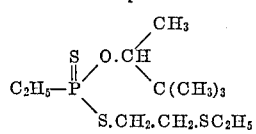

25 g. (0.2 mol) of ethyl-dithiophosphonic acid anhydride are dissolved in 150 ml. of pinacolinic alcohol. Subsequently, the resulting acid is neutralised with a sodium ethylate solution containing 0.2 mol of dissolved sodium. 25 g. of β-chloroethyl ethyl sulphide are then added dropwise at 70° C. while stirring. The mixture is heated at 70° C. for another hour and then worked up in usual manner. 48.4 g. of the new ester of B.P. 97° C./0.01 mm. Hg are thus obtained. Yield: 77% of the theoretical.

Calculated for mol 314.5: P, 9.9; S, 30.6%. Found: P, 10.0%; S, 31.3%.

Aphids and spider mites are killed completely with a solution of 0.001%. The compound shows an ovicidal action against the eggs of the red spider. Systemic action with 0.1% solutions is 100%.

Example 17

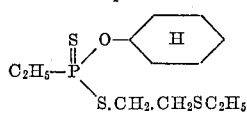

25 g. (0.2 mol) of ethyl-dithiophosphonic acid anhydride are dissolved in 150 ml. of cyclohexanol. The resulting acid is neutralised at room temperature with a sodium ethylate solution containing 0.2 mol of dissolved sodium. Subsequently, 25 g. of β-chloroethyl ethyl sulphide are added at 70° C. The mixture is heated at 70° C. for another hour and then worked up in usual manner. 43.3 g. of the new ester of B.P. 116° C./0.01 mm. Hg are thus obtained. Yield: 69% of the theoretical.

Calculated for mol 312.5: P, 9.9%; S, 30.8%. Found: P, 10.2%; S, 29.0%.

Aphids and spider-mites are killed completely with a solution of 0.001%. The compound shows an ovicidal action against the eggs of the red spider. Systemic action with 0.1% solutions is 100%.

Example 18

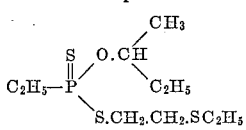

25 g. (0.2 mol) of ethyl-dithiophosphonic acid anhydride are dissolved in 150 ml. of secondary butyl alcohol. The resulting acid is neutralised at room temperature with a sodium ethylate solution containing 0.2 mol of dissolved sodium. Subsequently, 25 g. of β-chloroethyl ethyl sulphide are added at 70° C. The mixture is heated at 70° C. for another hour and then worked up in usual manner. 44.8 g. of the new ester of B.P. 94° C./0.01 mm. Hg are thus obtained. Yield: 78% of the theoretical.

Calculated for mol 286.4: P, 10.8%; S, 33.6%. Found: P, 11.2%; S, 33.1%.

Aphids and spider mites are killed completely with a solution of 0.001%. The compound shows an ovicidal action against the eggs of the red spider. Systemic action with 0.1% solutions is 100%.

Example 19

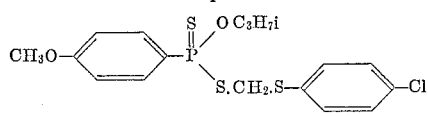

330 g. (1.5 mols) of 4-methoxy-phenyl-dithiophosphonic acid anhydride are stirred into 800 ml. of isopropyl alcohol. The mixture is slowly heated to 80° C. and kept at 80° C. for an hour. The 4-methoxy-phenyl-dithiophosphonic acid anhydride has then dissolved. Upon distilling off the excess isopropyl alcohol employed, 349 g. of 4-methoxy-phenyl-thionophosphone-O-isopropyl ester thiol acid are obtained. Yield: 89% of the theoretical.

15 g. of potassium hydroxide are dissolved in 100 ml. of methanol. 65 g. (0.25 mol) of 4-methoxy-phenyl-thionophosphone-O-isopropyl ester thiol acid are added at 20° C. Subsequently, 49 g. of p-chlorophenyl-α-chloromethyl thio-ether are added at 40° C. while stirring is continued. The reaction product is heated to 50° C. for a further hour and then poured into 200 cc. of ice water. The precipitated oil is taken up with 150 ml. of benzene and washed with water until neutral. The benzenic solution is dried over sodium sulphate and the solvent then removed under vacuum. 84 g. of the new ester are thus obtained as a pale yellow water-insoluble oil. Yield: 80% of the theoretical. Spider mites are killed completely with 0.01% solutions.

Calculated for mol 419: Cl, 8.5%; S, 22.9%; P, 7.3%. Found: Cl, 9.0%; S, 22.1%; P, 6.9%.

Example 20

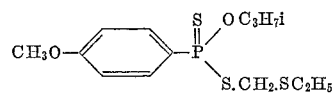

65 g. (0.25 mol) of the 4-methoxy-phenyl-thionophosphone-O-isopropyl ester thiol acid prepared according to the instruction of Example 19 are slowly added dropwise at 30° C. to 100 ml. of methanol in which 15 g. of caustic potash are dissolved. 28 g. of α-chloromethyl-thioethyl ether are added at 25° C. while stirring is continued. The mixture is further stirred at 25–30° C. for an hour and then worked up in usual manner. 53 g. of the new ester are thus obtained as a pale yellow water-insoluble oil. Yield: 63% of the theoretical.

Calculated for mol 336: S, 28.5%; P, 9.2%. Found: S, 28.2%; P, 9.5%.

Aphids and spider mites are killed completely with 0.01% solutions.

Example 21

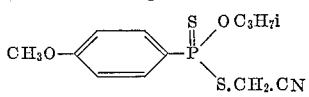

65 g. (0.25 mol) of the 4-methoxy-phenyl-thionophosphone-O-isopropyl ester thiol acid obtained according to Example 19 are added to 100 ml. of methanol containing 15 g. of dissolved caustic potash, 20 g. of α-chloromethyl-acetonitrile are added dropwise at 20° C. while stirring. The mixture is stirred at 20–25° C. for another hour and then worked up in usual manner. 63 g. of the new ester are thus obtained as a pale yellow water-insoluble oil. Yield: 84% of the theoretical.

Calculated for mol 301: N, 4.6%; S, 21.3%; P, 10.3%. Found: N, 4.5%; S, 21.3%; P, 10.2%.

Aphids and spider mites are killed completely with 0.01% solutions.

Example 22

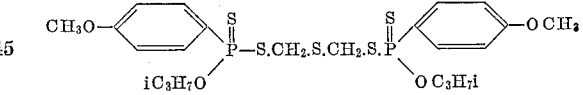

65 g. (0.25 mol) of the 4-methoxy-phenyl-thionophosphone-O-isopropyl ester thiol acid obtained according to Example 19 are added dropwise at 30° C. to 100 ml. of methanol containing 15 g. of dissolved caustic potash. Subsequently, 17 g. of α,α'-dichloromethyl sulphide are added at 40° C. The mixture is heated to 50° C. for an hour and then worked up in the usual manner. 53 g. of the new ester are thus obtained as a pale yellow water-insoluble oil. Yield: 73% of the theoretical.

Calculated for mol 582: S, 27.5%; P, 10.6%. Found: S, 29.0%; P, 10.4%.

Spider mites are killed completely with 0.01% solutions. The compound shows an ovicidal action against the eggs of the red spider.

Example 23

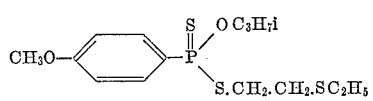

65 g. (0.25 mol) of 4-methoxy-phenyl-thionophosphone-O-isopropyl ester thiol acid are added dropwise at 30° C. to 100 ml. of methanol containing 15 g. of dissolved caustic potash. Subsequently, 42 g. of β-bromoethyl-thioethyl ether are added at 40° C. The mixture is stirred at 40–45° C. for another hour and then worked up in the usual manner. 72 g. of the new ester are thus obtained as a yellow water-insoluble oil. Yield: 82% of the theoretical.

Calculated for mol 350: S, 27.4%; P, 8.8%. Found: S, 27.9%; S, 8.4%.

Spider mites are killed completely with 0.01% solutions. The compound shows an ovicidal action against the eggs of the red spider.

By the same way there were produced:

| | | Percent yield of the theoretical |
|---|---|---|
| 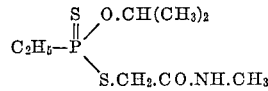 | Water-insoluble yellowish oil | 90 |
| 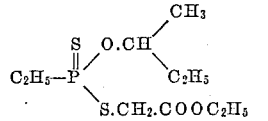 | B.P. 86° C./0.01 mm. Hg | 83 |
| 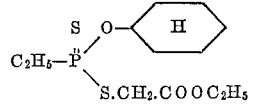 | B.P. 112° C./0.01 mm. Hg | 73 |
| 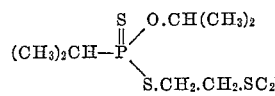 | B.P. 85° C./0.01 mm. Hg | 86 |
| 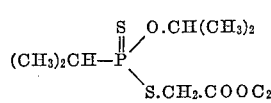 | B.P. 84° C./0.01 mm. Hg | 78 |
| 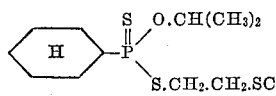 | Water-insoluble brown oil | 87 |
| 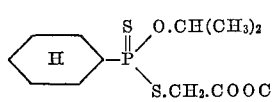 | do | 90 |
| 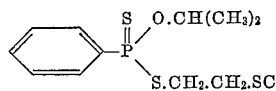 | B.P. 139° C./0.01 mm. Hg | 81 |
| 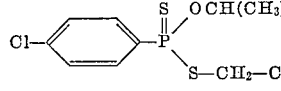 | | |
| 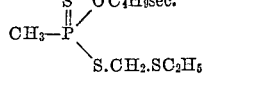 | B.P. 85° C./0.01 mm. Hg | 70 |
| 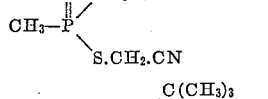 | B.P. 82° C./0.01 mm. Hg | 63 |
| 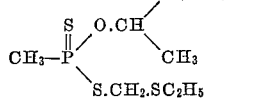 | B.P. 94° C./0.01 mm. Hg | 66 |
| 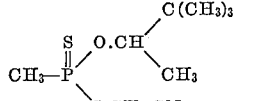 | B.P. 98° C./0.01 mm. Hg | 51 |
| 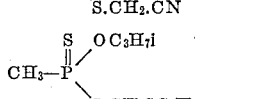 | B.P. 74° C./0.01 mm. Hg | 71 |

| | | Percent yield of the theoretical |
|---|---|---|
| 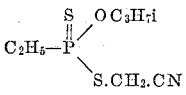 | B.P. 77° C./0.01 mm. Hg | 81 |
| 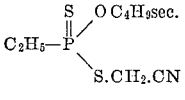 | B.P. 79° C./0.01 mm. Hg | 78 |
| 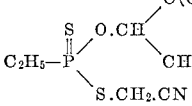 | B.P. 94° C./0.01 mm. Hg | 79 |
| 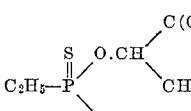 | B.P. 92° C./0.01 mm. Hg | 67 |

We claim:
1. A compound of the formula

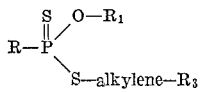

wherein R stands for a member selected from the group consisting of lower alkyl having up to 6 carbon atoms, cyclohexyl, phenyl, lower alkoxy phenyl and chlorophenyl; $R_1$ stands for a member selected from the group consisting of branched chain alkyl having up to 12 carbon atoms the α carbon of which is secondary and cyclohexyl; alkylene stands for lower alkylene having up to 4 carbon atoms and $R_3$ stands for a member selected from the group consisting of lower alkyl mercapto, phenyl mercapto, chloro phenyl mercapto, phenyl, chloro phenyl, carboxylic ethyl ester, cyano and

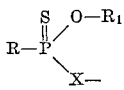

wherein X is a member selected from the group consisting of oxygen and sulfur and R and $R_1$ are as defined above.

2. The compound according to claim 1 wherein R stands for lower alkyl, $R_3$ stands for lower alkyl mercapto and $R_1$ stands for a branched chain alkyl having up to 12 carbon atoms the α carbon of which is secondary.

3. The compound according to claim 1 wherein R stands for lower alkyl, $R_3$ stands for chlorophenyl and $R_1$ stands for a branched chain alkyl having up to 12 carbon atoms the α carbon of which is secondary.

4. The compound according to claim 1 wherein R stands for lower alkyl, $R_1$ stands for a branched chain alkyl having up to 12 carbon atoms the α carbon of which is secondary and $R_3$ stands for

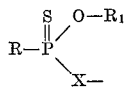

5. The compound of the following formula

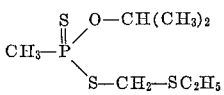

6. The compound of the following formula

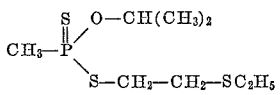

7. The compound of the following formula

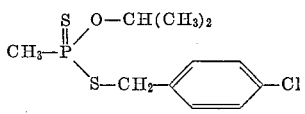

8. The compound of the following formula

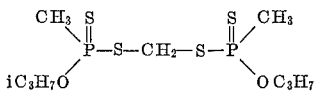

9. The compound of the following formula

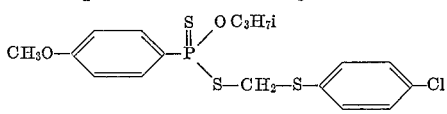

10. The compound of the following formula

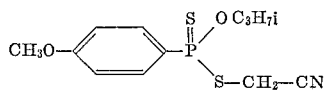

11. The compound of the following formula

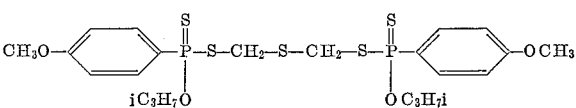

References Cited by the Examiner
UNITED STATES PATENTS

| | | | |
|---|---|---|---|
| 2,759,010 | 8/1956 | Lorenz et al. | 260—461.112 |
| 2,881,201 | 4/1959 | Schrader | 260—461.110 |
| 2,891,984 | 6/1959 | Gatzi et al. | 260—461.112 |
| 2,907,787 | 10/1959 | Hoffmann et al. | 260—461.110 |
| 2,983,748 | 5/1961 | Schlor et al. | 260—461.110 |
| 3,004,996 | 10/1961 | Arakelian et al. | 260—461.109 |
| 3,014,943 | 12/1961 | Schegk et al. | 260—461.310 |
| 3,041,365 | 6/1962 | Chupp et al. | 260—461.110 |

(Other references on following page)

UNITED STATES PATENTS

| | | |
|---|---|---|
| 3,057,774 | 10/1962 | Baker et al. __ 260—461.110 XR |
| 3,074,991 | 1/1963 | Schrader _____ 260—461.110 |

FOREIGN PATENTS

| | | |
|---|---|---|
| 1,248,399 | 5/1960 | France. |
| 1,032,247 | 6/1958 | Germany. |
| 1,081,458 | 5/1960 | Germany. |
| 740,444 | 11/1955 | Great Britain. |

OTHER REFERENCES

Razumov et al.: "Chem. Abst., vol. 52, col. 294(g) (1958).

CHARLES B. PARKER, *Primary Examiner.*

JOSEPH B. BRUST, ARTHUR H. WINKELSTEIN, *Examiners.*